United States Patent
Hill

[11] 3,932,852
[45] Jan. 13, 1976

[54] LIQUID LEVEL DETECTION SYSTEMS

[75] Inventor: William Frank Hill, Stafford, England

[73] Assignee: Lucas Electrical Company Limited, Birmingham, England

[22] Filed: Oct. 25, 1973

[21] Appl. No.: 409,449

[30] Foreign Application Priority Data
Nov. 17, 1972 United Kingdom............... 53085/72

[52] U.S. Cl............................ 340/244 R; 340/59
[51] Int. Cl.²........................................ G08B 21/00
[58] Field of Search............................ 340/59, 244

[56] References Cited
UNITED STATES PATENTS

| | | | |
|---|---|---|---|
| 3,350,710 | 10/1967 | Bridges | 340/59 X |
| 3,461,447 | 8/1969 | Marbouby | 340/244 E |
| 3,644,885 | 2/1972 | Radin | 340/244 C |
| 3,760,352 | 9/1973 | Marcoux | 340/59 |
| 3,781,839 | 12/1973 | Bodge | 340/244 R |
| 3,792,456 | 2/1974 | Hill | 340/59 |
| 3,810,143 | 5/1974 | Lawson et al. | 340/244 R |
| 3,813,629 | 5/1974 | Szeverenyi et al. | 340/244 R |

*Primary Examiner*—Donald J. Yusko
*Attorney, Agent, or Firm*—Holman & Stern

[57] ABSTRACT

A liquid level detection system has a monitoring device which contacts the liquid when the liquid level is above the predetermined level, and a positive temperature co-efficient resistor mounted in the system at the position where the temperature is to be sensed. The components are connected up in such a way that a warning is given if the liquid level falls or the temperature at a given point rises beyond a predetermined value.

1 Claim, 2 Drawing Figures

LIQUID LEVEL DETECTION SYSTEMS

BACKGROUND OF THE INVENTION

This invention relates to liquid level detection systems, more particularly for use in road vehicles.

The object of the invention is to provide a system which not only detects the level of the liquid and gives a warning if the level falls below a predetermined value, but also gives a warning if the temperature at a given point in the system rises above a predetermined value.

SUMMARY OF THE INVENTION

A system according to the invention comprises in combination a monitoring device mounted so that it contacts the liquid when the liquid level is above the predetermined level, the liquid being in the container which is earthed, and a positive temperature coefficient resistor mounted in the system at a position where the temperature is to be sensed, one terminal of the positive temperature coefficient resistor being connected to earth through the monitoring device and the liquid in series, so that if the liquid falls below the predetermined value, the impedance to earth will be substantially increased, the other terminal of the positive temperature coefficient resistor being connected to a circuit which gives a warning if the impedance to earth increases substantially, and also gives a warning of the resistance of the positive temperature coefficient resistor changes as a result of excessive rise of temperature in the vicinity of said resistor.

BRIEF DESCRIPTION OF THE DRAWINGS

In the accompanying drawings.

DETAILED DESCRIPTION OF A PREFERRED EMBODIMENT

Figure 1:
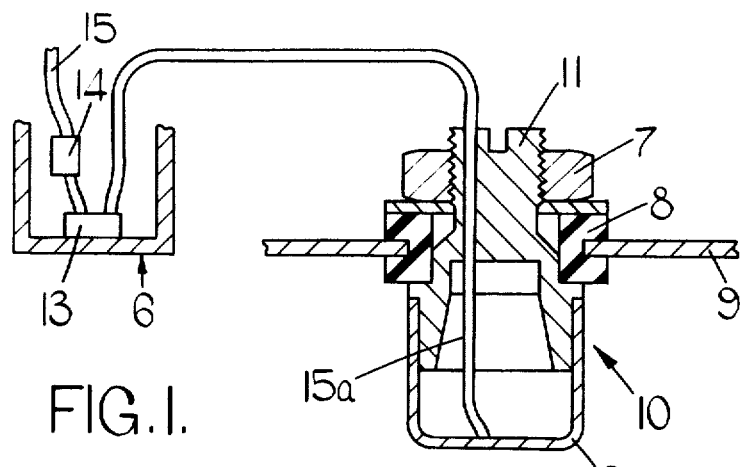
FIG. 1 is a sectional and partly diagrammatic view of a monitoring device and a positive temperature coefficient resistor used in accordance with one example of the invention.

Referring first to FIG. 1, the monitoring device is indicated generally by the reference numeral 10 and is connected to the lid 9 of a container having therein the liquid, the level of which is to be monitored. In a road vehicle, the liquid could be coolant, lubricating oil, fuel or hydraulic fluid by way of example.

The unit 10 comprises an electrically insulated bush 11 which is mounted in the lid 9 by means of a grommet 8 and associated nut 7. Secured to the lower end of the bush 11 is an electrically conductive cup 12 to the base of which is secured a lead 15a. The other end of the lead 15a is connected to one terminal of a positive temperature coefficient resistor 13 mounted on the base of an electrically insulating housing 6 which, where the system is used in a road vehicle, is mounted in a cylinder head of the vehicle. The other terminal of the resistor 13 is connected through a capacitor 14 to a lead 15.

Figure 2:
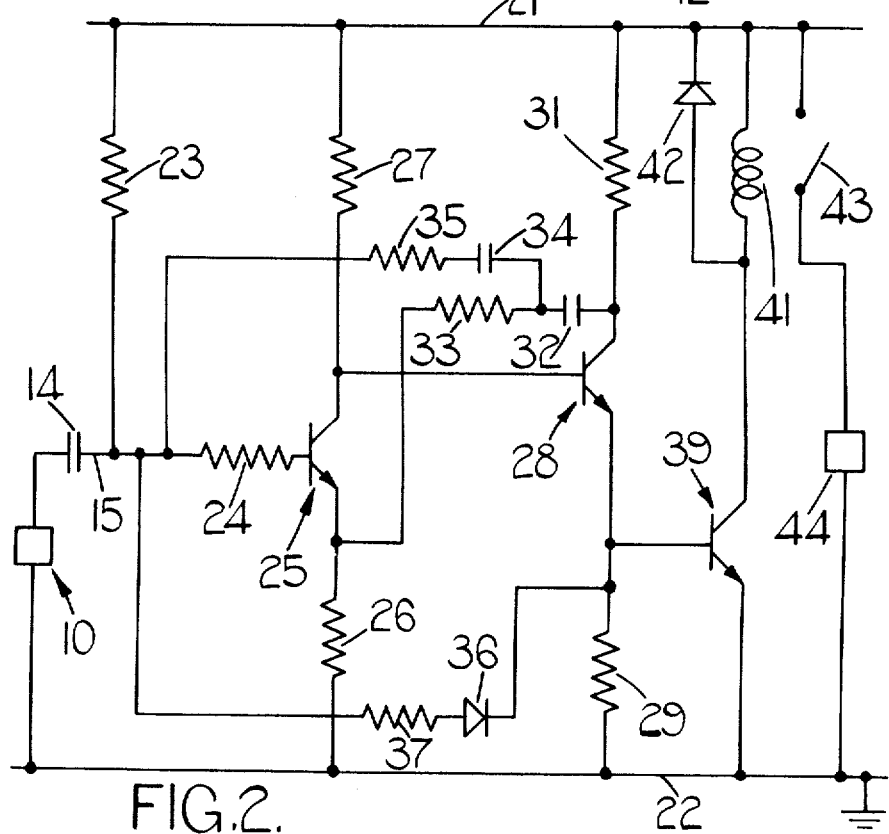
FIG. 2 is a circuit diagram of a system using the arrangement shown in FIG. 1.

Referring now to FIG. 2, the circuit includes positive and negative supply lines 21, 22, and the monitoring device is shown at 10 in FIG. 2 and is of course connected to the line 22, the connection shown representing the connection through the liquid, which will have a relatively low impedance as long as the liquid level is correct, but a substantially increased impedance if the liquid level falls below the cup 12. The capacitor 14 can be in the container 6 as shown in FIG. 1, or can be part of the circuit. The lead 15 is connected through a resistor 23 to the line 21, and is further connected through a resistor 24 to the base of an n-p-n transistor 25 having its emitter connected through a resistor 26 to the line 22 and its collector connected through a resistor 27 to the line 21. The collector of the transistor 25 is further connected to the base of an n-p-n transistor 28, the emitter of which is connected through a resistor 29 to the line 22 and the collector of which is connected through a resistor 31 to the line 21. The collector of the transistor 28 is connected through a capacitor 32 and a resistor 33 in series to the emitter of the transistor 25, and the junction of the capacitor 32 and resistor 33 is connected through a capacitor 34 and a resistor 35 in series to the lead 15. The emitter of the transistor 28 is connected through a diode 36 and a resistor 37 in series to the lead 15.

The emitter of the transistor 28 is further connected to the base of an n-p-n transistor 39, the emitter of which is connected to the line 22 and the collector of which is connected to the line 21 through the winding 41 of a relay, the winding 41 being bridged by a diode 42 and serving when energised to close a normally open contact 43 which is connected in series with a warning device 44 between the lines 21 and 22.

The transistors 25 and 28 constitute a multi-vibrator oscillator with positive feedback by way of the capacitors 32 and 34 and resistor 35 to the base of the transistor 25, and negative feedback by way of the capacitor 32 and resistor 33 to the emitter of the transistor 25. The amount of the positive feedback is determined by the impedance to earth of the path through the lead 15, capacitor 14 and unit 10, while the negative feedback is fixed by the resistors 33 and 26. Assuming that the level of the liquid is above the cup 12, and that the temperature of the resistor 13 is not excessive, then the impedance by way of the unit 10 is low and the positive feedback is insufficient to overcome the negative feedback, so that the circuit does not oscillate. The values of the various resistors in the circuit are selected so that in this condition, both transistors 25 and 28 are on, and current also flows through the diode 36. The conduction of the transistor 25 is insufficient to stop the transistor 28 from conducting, and the conduction of the transistor 28 is insufficient to turn on the transistor 39, so that the winding 41 is not energised.

If the level of liquid falls below the cup 12, then the impedance by way of the unit 10 is increased substantially, and there is sufficient positive feedback to the base of the transistor 25 to overcome the negative feedback and cause the circuit to oscillate. During oscillation, when the transistor 28 is on, the transistor 39 is provided with base current and is turned on to energise the winding 41. When the transistor 28 is off, the transistor 39 is also off, but the energy stored in the winding 41 causes current to flow through the diode 42, the period of oscillation being such that the winding 41 is kept energised. The contact 43 therefore closes to energise the warning device 44. By virtue of the diode 36, the off periods of the transistor 25 are substantially in excess of the on periods of the transistor 25, and typically the transistor 39 is turned on for about 90 percent of the period of the multivibrator oscillator. As a result, a substantial proportion of the supply voltage appears as the average voltage across the winding 41.

If the liquid level is above the cup 12, but the temperature of the resistor 13 becomes excessive, then again the impedance through the unit 10 increases substantially and the positive feedback becomes sufficiently large to cause the circuit to oscillate, so that the warning device 44 is energised.

The warning device 44 can take a variety of forms, and could simply be a lamp. However, in some cases an audible warning is to be preferred, and in one arrangement an audible indication can be obtained from the transistor 39 without using the winding 41 by coupling the output from the transistor 39 to the loud-speaker of a car radio, resulting in a high-pitched noise whether or not the radio is on. Alternatively a suitable electro-acoustic transducer may be used in place of the winding 41, and/or a warning lamp may be used in this circuit position. Where the liquid monitored is engine coolant, the relay 41 may be used to control an electrically operated radiator fan, in which case an audible warning device need not be used.

I claim:

1. A system for monitoring both the level of a liquid in a container and the temperature of a component remote from said container, which comprises:

monitoring means in a liquid container which is electrically grounded, which contacts the liquid at a first location in said container when the liquid level is above a predetermined level;

a positive temperature coefficient resistor mounted at a second location on said component, remote from said container, said resistor being electrically insulated from said component at said second location whose temperature is desired to be monitored;

one terminal of said positive temperature coefficient resistor being connected to ground through said monitoring means and said liquid in series, so that if the liquid level falls below said predetermined level, the impedance to ground will be substantially increased;

the other terminal of said positive temperature coefficient resistor being connected to a circuit which includes means for providing a warning if the impedance to ground increases substantially as a result of either said liquid falling below said predetermined level at said first location or if the resistance of said positive temperature coefficient resistor changes as a result of an excessive rise in temperature at said second location.

* * * * *